United States Patent

[11] 3,614,343

| [72] | Inventors | John E. Mulhern, Jr.;<br>Dwight M. Harris, both of Durham, N.H. |
|---|---|---|
| [21] | Appl. No. | 796,690 |
| [22] | Filed | Feb. 5, 1969 |
| [45] | Patented | Oct. 19, 1971 |
| [73] | Assignee | The United States of America as represented by the Administrator of the National Aeronautics and Space Administration |

[54] RECORDER USING SELECTIVE NOISE FILTER
8 Claims, 4 Drawing Figs.

[52] U.S. Cl. ................................................ 179/100.2 K
[51] Int. Cl. ...................................................... G11b 27/32, G11b 27/36
[50] Field of Search .......................................... 179/100.2 A, 100.2 B, 100.2 S, 15.55, 100.2, 100.2 K, 100.1 TC; 340/174.1 G, 174.1 H; 346/29, 33, 74 M, 74; 324/47, 112, 113, 37, 40, 43

[56] References Cited
UNITED STATES PATENTS

| 2,170,751 | 8/1939 | Gabrilovitch | 179/15.55 |
|---|---|---|---|
| 2,475,742 | 7/1949 | Hammond | 179/100.2 R |
| 2,879,499 | 3/1959 | Ackerlind | 179/100.2 R |
| 3,181,171 | 4/1965 | Erickson | 346/33 |

Primary Examiner—Bernard Konick
Assistant Examiner—Alfred H. Eddleman
Attorneys—John R. Manning, William H. King, Garland T. McCoy and Howard J. Osborn ABSTRACT: A recording method and system is disclosed which provides for selective reprocessing and filtering of the data to obtain the optimum signal-to-noise ratio without a corresponding loss of the data range or fidelity. More particularly, an improved method and system is disclosed for producing a multidimensional recording of a multivariable data signal with a minimum amount of low-frequency noise and interference in the signal.

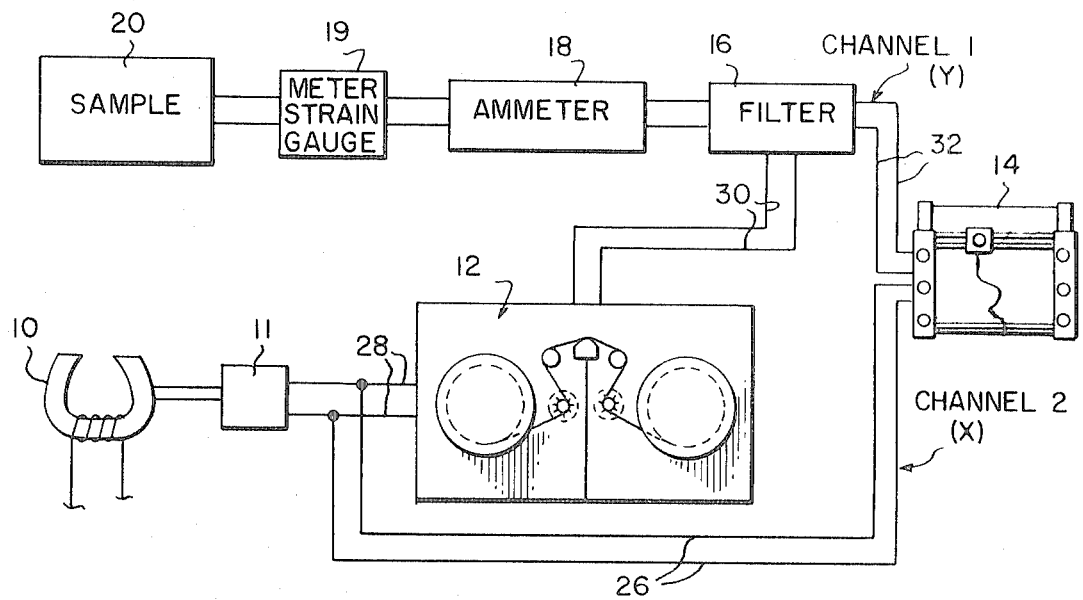
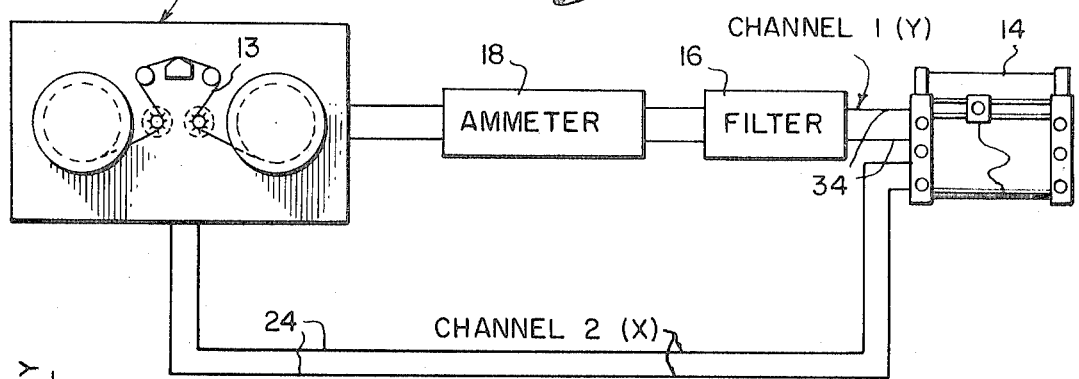
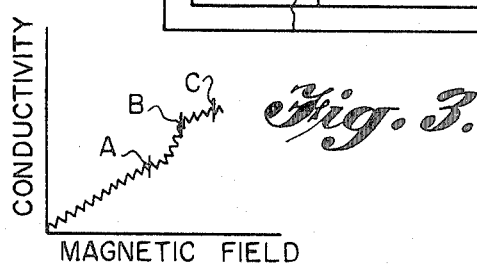
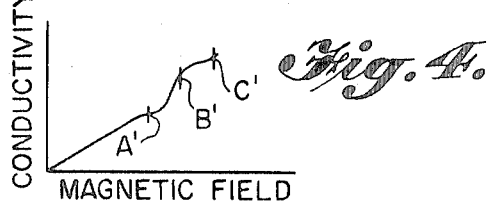
INVENTORS
JOHN E. MULHERN, JR. &
DWIGHT M. HARRIS

RECORDER USING SELECTIVE NOISE FILTER

The invention described herein was made by employees of the United States Government and may be manufactured and used by or for the Government for governmental purposes without the payment of any royalties thereon or therefor.

BACKGROUND OF THE INVENTION

Noise voltages are present in all types of electronic data processing systems. These noise voltages have an order of magnitude in the millivolt range; and since the data signals in measuring and testing systems, as well as in data processing systems, have an order of magnitude in the microvolt and nanovolt ranges, the noise voltages often can overpower the data signal voltages causing a loss of the data. Therefore the designer of a system, for example a microwave antenna, a data processing system, or an electronic measuring and testing system, may measure and process false data signals and loads which are, in reality, produced at least partially by interference and noise.

In many systems one type of noise signal usually dominates the other types of noises. This noise, often denominated the primary noise, does not always come from the same source, and may be caused by any one of a number of sources including but not limited to: random fluctuations of energy in the true data signal; the signal detector (internal noise); faulty connections (particularly in the connections from the detector to the amplifier); faulty ground loops; the amplifier (internal noise); mechanical vibrations; switching transients from relays, motors, transistors and other components in the system; and magnetic or electrostatic pickup from the power line.

In recording and plotting systems, it is often necessary to eliminate low-frequency noise which is a part of the data signal or which is acquired by the data signal during the various processing steps. Prior art techniques include the use of a preset filter network and a boxcar integrator. However, each of these prior art techniques has its attendant disadvantages. More specifically, the disadvantage of using a preset filter is the loss of valuable information above the cutoff frequency. Once the filter frequency is set, all information below the cutoff frequency is passed to the system for further processing and all information above the cutoff frequency is rejected or blocked from the system. The disadvantage of using the boxcar integrator is that unless the frequency range of the data and its oscillations are known in advance, the data must be gathered and processed repeatedly to obtain the optimum signal-to-noise ratio and the optimum signal utilization. These disadvantages result in a loss of time, a loss of potentially valuable data, or both.

The increased need for precision measurements has become more readily apparent as the speed of computers increases and as the reliability of components becomes more and more critical. In addition to being useful in measuring parameters of electrical components with higher precision, applicants' invention also encompasses use in research experimentation which requires a high degree of accuracy in the evaluation of data and in the measuring and evaluation of the physical properties of various materials. The method and apparatus of applicants' invention, therefore, includes data processing, and measuring and testing, as well as data recording. Utilizing applicants' novel method and system as will hereinafter be described in detail, it is possible to perform, more accurately and inexpensively, research experiments without the costly waste of expensive materials, and with a more economical use of the talent and energy of the research scientist.

It is therefore a general object of our invention to provide a method and apparatus for obtaining highly accurate data during measuring and testing of physical properties.

It is also a general object of our invention to provide a method and apparatus for obtaining highly accurate data during research experimentation.

It is yet another object of our invention to provide for the nondestructive processing of data signals.

It is a further object of the present invention to provide a method and apparatus for selectively filtering noise from the data signal.

It is another object of the present invention to provide a method and system for filtering data to eliminate noise when the frequency range of the data is unknown.

It is still another object of the invention to provide a method and system for filtering data to eliminate noise when the frequency range of the noise oscillations is unknown.

It is a further object of our invention to provide a method and apparatus for deriving a multidimensional recording of the data signal while obtaining an optimum signal-to-noise ratio.

It is a further object of the present invention to provide a method and apparatus for selectively filtering one channel of information to reduce noise without a corresponding loss of data fidelity or information.

It is still another object of our invention to provide a method and apparatus for processing data to obtain the most accurate X–Y recording of the data.

It is a further object of our invention to provide a method and apparatus for processing data to obtain an X–Y recording of the varying physical properties of the material being tested.

Finally, it is another object of our invention to provide a method and apparatus for recording data which is responsive to both low frequency data oscillations and high frequency data oscillations.

These and other objects and advantages of our invention will become more evident from the following detailed description when read in conjunction with the accompanying drawings wherein like numerals represent like components and in which:

FIG. 1 is a schematic-block representation of the apparatus for initially recording the data according to the principles of our invention;

FIG. 2 is a schematic-block representation of the apparatus for the selective filtering and nondestructive readout and plotting of data according to the principles of our invention;

FIG. 3 is a representative plot of the voltage as a function of the magnetic field showing the noise and the data superimposed on the noise;

FIG. 4 is a representative plot of the voltage as a function of the magnetic field showing the extracted data after the noise has been attenuated according to the principles of our invention.

With reference to the FIG. 1, there is shown in block form the apparatus for initially recording data signals according to the principles of our invention. In a preferred embodiment the apparatus is described as used to analyze a physical property; more specifically, the conductivity of a material such as silicon as a function of the applied magnetic field. A sample of silicon (or other material being tested) 20 is connected in series with a meter-strain gauge combination 19. The meter portion of the combination 19 monitors the conductivity and the meter reading is conventionally converted by the strain gauge portion of the combination 19 to a voltage. The output of the strain gauge portion of the combination 19 is connected to a Keithley microvolt ammeter 18. While other meters could be substituted the Keithley meter is preferred for its stability and sensitivity. Here the Keithley meter is also used to boost the signal from the 0–10 millivolt range to the 0–10 volt range. With a tape recorder 12 operating at its slow speed, for example 1⅞ inches per second, a magnetic field is generated in the area of the sample 20. This field may be generated by a conventional generator and is shown, for illustrative purposes only, as being generated by introducing an electrical current (from a source not shown) into the windings surrounding the magnetizable metal 10. The intensity of the magnetic field is measured and converted into a voltage by a device which may be, by way of example, another meter-strain gauge combination 11. The meter portion of the combination 11 monitors the intensity of the magnetic field and the meter reading is converted by the strain gauge portion of the combination 11 to a voltage which represents the intensity of the magnetic field.

It is necessary to use an FM recording since AM recording has very poor frequency response below 50–75 cycles per second, and, in applications such as measuring the conductivity of a sample of silicon 20 as a function of the magnetic field, the data is of low frequency. Therefore the recording must provide good response down to DC. The tape recorder 12 should be calibrated such that the ratio of the output signal during playback to the input signal during recording is unity. In addition, the tape recorder 12 must be of the type adaptable to record two channels simultaneously, and should be selectively operable, as a minimum, at two speeds.

The two channels of the recorder 12 are used to record the dependent and independent variables of the data as follows. Channel 1 will be arbitrarily designated as the channel upon which the dependent variable (Y) will be recorded. The dependent variable is, in the preferred embodiment, a voltage indicative of the conductivity of a sample 20, such as silicon, under the influence of a magnetic field. The voltage from the meter-strain gauge combination 19, which represents this conductivity, is amplified and introduced into a voltage by a factor of one thousand, and the output from the filter 16 is passed to the tape recorder 12 via a pair of conductors 30. In a conventional manner this voltage is written onto one channel of the tape by the tape recorder.

Channel 2 will be designated a the channel upon which the independent variable (X) will be recorded. The independent variable is, in the preferred embodiment, a voltage indicative of the intensity of the magnetic field. As previously indicated the magnetic field intensity is measured by the meter portion of the combination 11 and converted into a voltage by the strain gauge portion of the combination 11. The output of the strain gauge portion of the combination 11 is passed to the tape recorder 12 by a pair of conductors 28. In a conventional manner this voltage is also written onto the tape recorder. Therefore, the data being recorded on the tape recorder 12 is the conductivity (channel 1) as a function of the magnetic field (channel 2).

As an optional feature, shown in FIG. 1, both the conductivity and magnetic field intensity can also be employed as the Y and X inputs, respectively, to an X-Y recorder or plotter 14. The Y input is passed via conductors 32 from the output of the filter network 16 to the Y input of the plotter 14 and the X input is passed via a pair of conductors 26 from the output of the meter-strain gauge combination 11 to the X input of the plotter 14. The use of plotter 14 is not required during the recording portion of our invention, but has the advantage, among other things, of permitting an advance evaluation of the range of the data being recorded.

With reference to FIG. 3, there is shown a representative plot of the conductivity of the sample (abscissa) as a function of the magnetic field (ordinate). The plot of FIG. 3 represents a significant amount of noise superimposed on a small modulating data signal. The solution which is accomplished according to the principles of our invention is the extraction of the data signal and the attenuation of the noise, for example from A to B to C.

Once the data is thus recorded on the tape recorder 12, it is, of course, necessary to rewind the tape before proceeding to analyze the data. It is, however, within the scope of our invention to use FM recording techniques on other types of recording media, including but not limited to magnetic disks and drums where actual "rewinding" as the term is applied to a magnetic tape would not be necessary. As seen in FIG. 2 it is no longer necessary to use either the sample 20 or the source of the magnetic field 10 to proceed with the data analysis. All the necessary data is now recorded; and the selective filtering of the data, to eliminate noise and unwanted frequencies, may take place at the convenience of the operator. As during the recording of the data the independent variable (X), which represents the magnetic field intensity and is available on the channel 2, is connected as the X input to the X-Y recorder 14. Since the data is FM recorded selecting a faster playback speed will automatically regulate the upper frequency of the data oscillations which are to be saved. Therefore, in order to aid in the elimination of noise and to permit selective filtering, it is necessary to increase the playback speed of the recorder 12 to a speed greater than the initial recording speed.

While the independent variable (X) is being passed to channel 2 of the plotter via conductors 24, the output of channel 1, the dependent variable representing conductivity, is passed through the microvolt ammeter 18, which boosts the output to the 0–10 volt range, and passed through a voltage divider and one-cycle filter 16 and then on to the Y INPUT OF THE X-Y plotter 14 via conductors 34. If the plot of data seen at 14 is not acceptable, it is only necessary to rewind the tape 13, make a corresponding change in the playback speed of the tape recorder 12 or the voltage divider and filter network 16, and again perform the playback operation. If too much noise should appear in the data signal on the X-Y plotter (as evidenced by rapid oscillations) the cutoff frequency should be decreased. Similarly, if too much true data is lost, the cutoff frequency should be increased. The evaluation of whether or not there is too much noise is predominately subjective. If the operator determines that the data displayed on the X-Y recorder 14 can be accurately interpreted then the playback of the data may be terminated. If, however, the operator desires to study additional data with a different cutoff frequency of the noise, then the playback operation must be repeated with a different cutoff frequency as will be explained hereinafter. Criteria which the operator may use to base his determination of the acceptability of the data plot is the desirability of raising the effective frequency of the noise as much as possible while not losing any data. That is, as much noise as possible must be eliminated by the change in cutoff frequency while keeping the data frequency below the cutoff frequency. This provides what is known as the optimum signal-to-noise ratio. For example, using the one-cycle filter 16, the operator will increase the tape speed as much as possible subject to the condition that any oscillations in the data are below one-cycle.

To obtain the different cutoff frequencies during subsequent playback operations it is possible to decrease the cutoff frequency by increasing the tape speed of the tape recorder 12, or increasing the time-constant of the filter 16, or both. Decreasing the cutoff frequency will eliminate additional noise. Similarly the cutoff frequency is increased by decreasing the playback speed of the tape recorder 12, or decreasing the time-constant of the filter 16, or both. This decrease in the cutoff frequency will return data to the processed signal and also increase the noise in the signal. By selectively manipulating the cutoff frequency and viewing the resulting data plot on the X-Y plotter 14, it is possible to obtain the optimum representation of the true data, in this case the conductivity, as a function of the magnetic field. The use of the tape recorder is one form of nondestructive data read out, since the tape may be rewound and the data analyzed repeatedly without the necessity of setting up the experimental conditions again.

With reference to FIG. 4, the result of this manipulation of the cutoff frequency is shown as a representative plot of the waveform of FIG. 3 with satisfactory signal-to-noise ratio as determined by the operator in accordance with the above-described criteria. The points A', B', and C' correspond to the points A, B, and C in the waveform of FIG. 3, respectively. The result of the manipulation of the cutoff frequency is to extract the data signal from A' to B' to C' and attenuate the noise. The data oscillation is a very low frequency signal, on the order of 1 cycle per second. Comparing FIGS. 3 and 4, therefore, FIG. 3 represents the initially recorded data; significant amount of noise with a low frequency modulating signal superimposed from A to B to C, and FIG. 4 represents the noise attenuated and the extracted signal oscillation (from A' to B' to C').

From the above description of the preferred embodiment of the invention, the various other uses to which it may be employed are readily ascertainable to those skilled in the art; and the field of use is not restricted to analyzing conductivity as a function of the magnetic field intensity. Any experimental use where data may be converted into an analog voltage (that is, a voltage signal which is representative of the relative changes in the value of data) may be processed and evaluated in this manner. For example, any tests on materials which may be "measured" may be converted by an appropriate transducer (including, but not limited to magnetic, optical and photoresistive devices and mechanical devices such as strain gauges) to the appropriate form for input to the FM recorder of our invention.

The principles of our invention having been fully explained in connection with the preferred embodiment, it should now be understood that our invention is subject to many variations, modifications and substitutions by those skilled in the art without departing from the spirit of our invention. Therefore, it is intended that the description of the preferred embodiment shall be interpreted as illustrative and not as limiting our invention, since modifications are within the scope of our appended claims.

What we claim is:

1. A method of selectively filtering and recording data to obtain the optimum signal-to-noise ratio using a first recorder, operable at first and second speeds, and a second recorder, operable to record data played back from the first recorder, comprising the steps of:
   a. initially recording said data at a first speed on said first recorder which includes simultaneously recording two variables on separate portions of said first recorder,
   b. preparing said first recorder to play back the data,
   c. playing back the data at a second speed to generate modified data without changing the initially recorded data which includes simultaneously playing back and modifying both of said variables,
   d. selectively filtering said modified data which includes filtering only one of said two variables of modified data, and
   e. processing said modified data to evaluate the effect of the speed and selective filter on the initial data, thereby indicating the filtering necessary to obtain the optimum signal-to-noise ratio.

2. The method of claim 1 wherein the step of initially recording is performed by frequency modulation and said first recorder is magnetic.

3. The method of claim 2 wherein the step of processing said modified data further comprises the steps of:
   a. recording said modified data on said second recorder,
   b. evaluating the signal-to-noise ratio of the data recorded on said second recorder,
   c. altering the effect of the filter to further adjust the modified data, and
   d. repeatedly recording said modified data, evaluating the signal-to-noise ratio and altering the effect of the filter to obtain the optimum signal-to-noise ratio of the data on said second recorder.

4. In apparatus for recording and filtering data to obtain recorded data having an optimum signal-to-noise ratio, said apparatus comprising a first recorder operable to record at first and second speeds, and a second recorder operable to record the data played back from said first recorder, the improvement comprising:
   a. means for initially recording data containing a first variable on a first channel and a second variable on a second channel of said first recorder at a first speed,
   b. said recording means further comprising means to play back said initially recorded data at a second speed to generate modified data without changing the initially recorded data,
   c. filter means to further modify one of said modified data variables, and
   d. processing means for evaluating the effect of the second speed and filter on the initial data, thereby indicating the filtering necessary to obtain the optimum signal-to-noise ratio.

5. The apparatus of claim 4 wherein said processing means further comprises:
   e. second recording means to record the modified data.

6. The apparatus of claim 5 wherein said means for initially recording data further comprises a magnetic recorder.

7. The apparatus of claim 6 wherein said means for initially recording data further comprises a frequency modulated recorder.

8. The apparatus of claim 7 wherein said second recording means further comprises an X–Y plotter.